United States Patent [19]

Forrester et al.

[11] Patent Number: 5,641,271
[45] Date of Patent: Jun. 24, 1997

[54] FLOAT OPERATED PUMP INCLUDING DIAPHRAGM VALVE ASSEMBLY WITH BLEED PASSAGE

[75] Inventors: Alan J. Forrester, Nimmitabel; Paavo M. Laukkanen, Mount Isa, both of Australia

[73] Assignee: M.I.M. Holdings Limited, Brisbane, Australia

[21] Appl. No.: 351,316

[22] PCT Filed: Jun. 17, 1993

[86] PCT No.: PCT/AU93/00289

§ 371 Date: Feb. 3, 1995

§ 102(e) Date: Feb. 3, 1995

[87] PCT Pub. No.: WO93/25833

PCT Pub. Date: Dec. 23, 1993

[30] Foreign Application Priority Data

Jun. 17, 1992 [AU] Australia .................. PL2997

[51] Int. Cl.⁶ .................................................. F04F 1/06
[52] U.S. Cl. ................ 417/128; 417/131; 417/134; 417/146; 137/393; 137/498; 251/46; 251/65
[58] Field of Search ................ 417/126, 128, 417/130, 131, 134, 138, 143, 144, 145, 146, 147; 137/393, 498; 251/46, 65

[56] References Cited

U.S. PATENT DOCUMENTS

| 209,867 | 11/1878 | Craigie | 251/46 |
|---|---|---|---|
| 464,651 | 12/1891 | Cummings . | |
| 1,437,686 | 12/1922 | Selin . | |
| 1,536,632 | 5/1925 | Rogers | 417/128 |
| 1,757,666 | 5/1930 | Hart . | |
| 1,779,319 | 10/1930 | Jennings | 417/128 |
| 1,838,433 | 12/1931 | Montaney . | |
| 1,839,140 | 12/1931 | Butler . | |
| 1,894,367 | 1/1933 | Corcoran . | |
| 2,141,427 | 12/1938 | Bryant . | |
| 2,184,706 | 12/1939 | Bennett . | |
| 2,209,617 | 7/1940 | Thomas . | |
| 2,231,158 | 2/1941 | Davis . | |
| 2,362,802 | 11/1944 | Ciabattari . | |
| 2,394,169 | 2/1946 | Gray et al. . | |
| 2,691,386 | 10/1954 | Madison . | |
| 2,730,961 | 1/1956 | Yeomans | 417/128 |
| 2,963,037 | 12/1960 | Woodward . | |
| 3,357,365 | 12/1967 | Golay . | |
| 3,666,173 | 5/1972 | Ray | 251/46 |
| 3,704,962 | 12/1972 | Weeks | 417/146 |
| 3,905,724 | 9/1975 | Strebel . | |
| 3,967,808 | 7/1976 | Lieding | 251/46 |
| 3,972,650 | 8/1976 | Brennan . | |
| 4,025,237 | 5/1977 | French . | |
| 4,060,370 | 11/1977 | Fleer . | |
| 4,083,661 | 4/1978 | McPherson et al. . | |
| 4,092,087 | 5/1978 | Anthony et al. . | |
| 4,321,017 | 3/1982 | Gottliebson . | |
| 4,360,038 | 11/1982 | Trinkwalder, Jr. . | |
| 4,499,921 | 2/1985 | Stoll . | |
| 4,549,571 | 10/1985 | Kelly . | |
| 4,624,443 | 11/1986 | Eidsmore . | |
| 4,750,705 | 6/1988 | Zippe . | |
| 4,844,112 | 7/1989 | Pick et al. | 251/46 |
| 5,067,516 | 11/1991 | Gale | 251/46 |
| 5,080,126 | 1/1992 | De Rycke et al. | 417/126 |
| 5,141,404 | 8/1992 | Newcomer et al. | 417/130 |

FOREIGN PATENT DOCUMENTS 453750 9/1974 Australia .

*Primary Examiner*—Timothy Thorpe
*Assistant Examiner*—Ted Kim
*Attorney, Agent, or Firm*—Watson Cole Stevens Davis, P.L.L.C.

[57] ABSTRACT

Pump (1) includes a pneumatic valve assembly (98) having a chamber (105) which is supplied by compressed air via an inlet pipe. Included within chamber (105) is a valve (109) with a chamber (111) divided into two separate compartments (112,113) by a pliant diaphragm (114). Diaphragm (114) is biased toward compartment (112) by a spring (115) and supports a plunger (116) which extends from chamber (111) and includes a frusto conical end (117) for selectively engaging seat face (99) and preventing air flow between chambers (105,90). Two air bleed passageways (119,120) respectively extend from chamber (90) and compartment (113) to atmosphere for allowing a gradual return to atmospheric pressure therein when the supply of compressed air is discontinued. A further bleed passageway (121) extends through diaphragm (114) to ensure a gradual equalization of pressure in compartments (112,113) such that the diaphragm will return to its original biased position. An aperture (125) extends between compartment (112) and chamber (91) and is selectively closed by a switch mechanism (126) to prevent fluid flow therethrough. Switch mechanism (126) selectively opens valve assembly (98) in response to liquid filling sump (6) and raising float (42) to an operative position. This allows compressed air to pressurize sump (6) and evacuate fluid from sump (6) via outlet pipe (22).

6 Claims, 7 Drawing Sheets

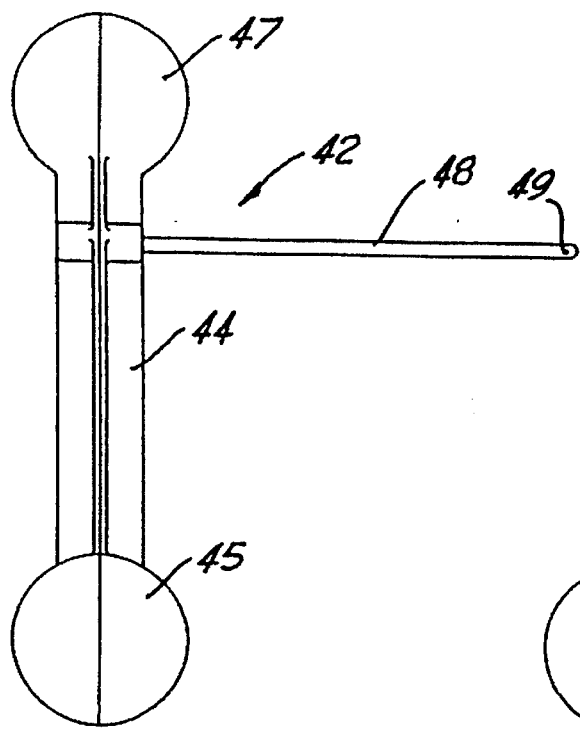
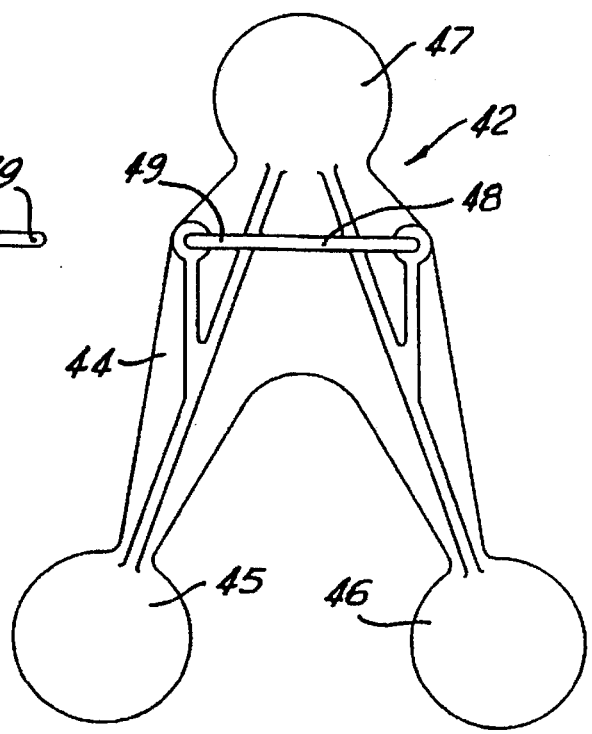
FIG.3    FIG.4
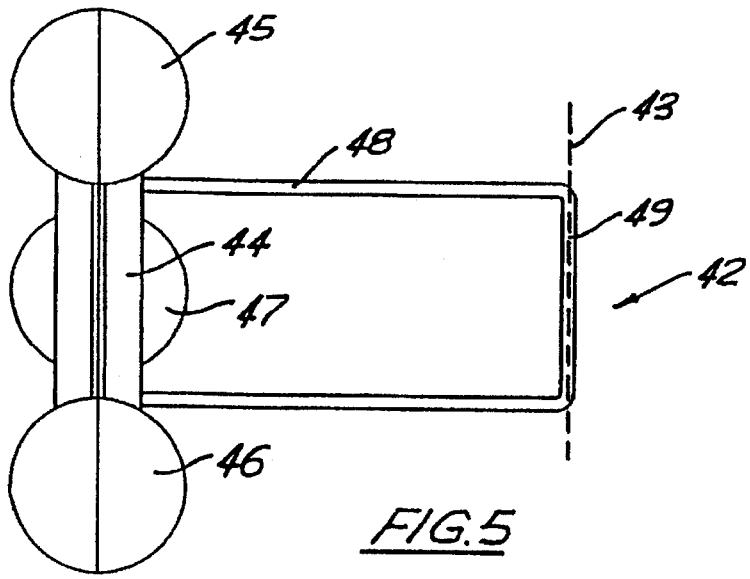
FIG.5

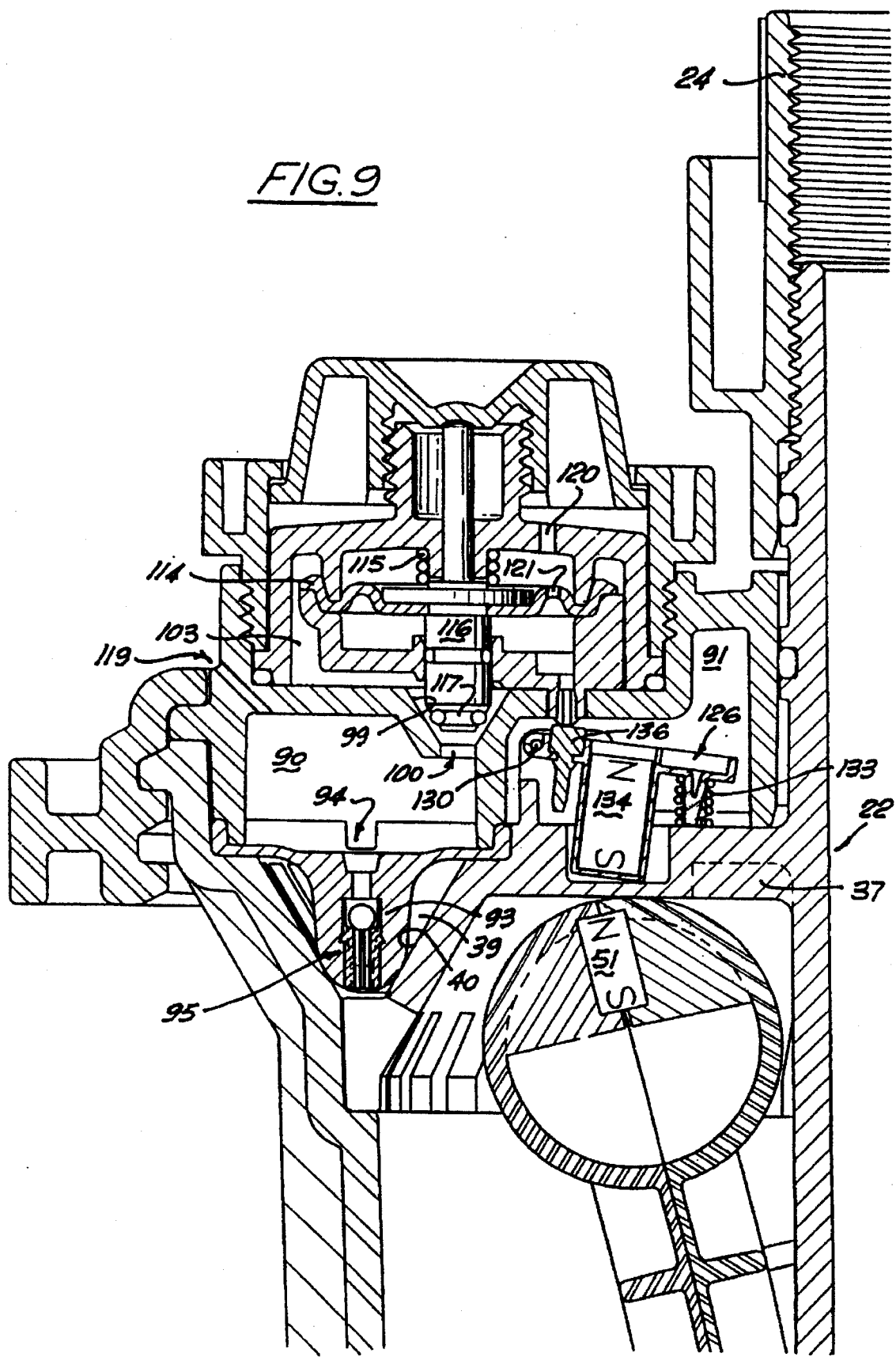

FLOAT OPERATED PUMP INCLUDING DIAPHRAGM VALVE ASSEMBLY WITH BLEED PASSAGE

TECHNICAL FIELD

The present invention relates to a pneumatic pump and in particular to a valve assembly.

The invention has been developed primarily for use in removing water from mining excavations and will be described hereinafter with reference to that application. However, it will be appreciated that the invention is not limited to this particular field of use and is also suitable for pumping water and other fluids from wells, tanks and other reservoirs.

BACKGROUND ART

Hitherto, pneumatically operated pumps for use in mining applications have generally included a sump into which water flows for subsequent propulsion therefrom by an impeller or double acting diaphragm which is driven by compressed air. It is standard practice to leave such pumps running continuously to ensure a substantially water free mining environment at all times. However, such a mode of operation leads to high levels of wear and failure, especially when water is not passing into the sump.

Automatic control systems and valves have been contemplated, however, these involve complicated switching systems which due to their intricate nature are not suitably durable for use in a mining environment.

Moreover, to leave such pump running dry is highly inefficient since each pump requires 50 to 100 cubic feet of compressed air per minute, the large majority of which is wasted. These pumps are also bulky and cumbersome and as such difficult to move in the confined spaces in a mine.

Prior art pumps and the valve systems used therein are generally expensive to produce, require a relatively large number of moving parts, and incorporate a large number of aluminum components which are readily corroded by the alkaline or acidic waters often encountered.

DISCLOSURE OF THE INVENTION

It is an object of the present invention, at least in its preferred embodiment, to overcome or substantially ameliorate at least some of these deficiencies of the prior art.

It is another object of the present invention to provide a simple and durable pump and valve which are ideally suited to mining applications.

According to a first aspect of the invention there is provided a valve assembly for selectively supplying a fluid through a passageway having a seat face, the valve assembly including:

a valve chamber divided into a first and second compartment by a first pliant diaphragm and including a port, said first diaphragm being biased toward the first compartment;

a plunger extending between a first end disposed within said chamber and a second end disposed outside said chamber, said plunger being responsive to movement of said first diaphragm for selectively sealingly engaging the seat face with said second end, wherein said plunger extends through and sealingly engages said port;

an aperture extending between the first compartment and the passageway upstream of the seat face for allowing fluidic communication therebetween;

a pilot valve biased toward a closed position over the aperture and selectively movable into an open position for allowing the fluid to enter the valve chamber and move the diaphragm against the bias and thereby withdraw the second end of said plunger from the seat face; and a bleed passage extending between the first and second compartments for allowing a gradual equalisation of fluidic pressure therebetween; whereby movement of the pilot valve into the closed position effects a delayed presentation of the plunger to the seat face. Preferably, the fluid is compressed air.

Preferably also, the second compartment is in fluidic communication with the atmosphere and the bleed passage is in the form of a small aperture in the diaphragm.

In a preferred form, the valve assembly includes switching means for selectively actuating said assembly and which is more preferably responsive to a magnetic field of predetermined magnitude. Even more preferably, the switching means includes a magnet movable in response to the magnetic field.

According to a second aspect of the invention there is provided a pneumatic pump including:

a main chamber for containing a liquid to be pumped and having an inlet and outlet through which the liquid respectively enters and exits the main chamber;

a float movable between a lowered and raised position in response to the level of the liquid in the main chamber; and a valve assembly as described above wherein the passageway, downstream of the seat face, opens into the main chamber, wherein movement of the float into and from the raised position moves the pilot valve to an opened and closed position respectively for selectively supplying compressed air to the main chamber to remove the liquid therefrom.

Preferably, the main chamber includes an exhaust port for allowing the liquid to freely enter the main chamber when the plunger engages the seat face, the exhaust port being closed during the supply of compressed air to the main chamber.

Preferably also, the outlet includes a pipe centrally extending within the main chamber and providing a path along which the float progresses.

BRIEF DESCRIPTION OF THE DRAWINGS

A preferred embodiment of the invention will be described, by way of example only, with reference to the accompanying drawings in which:

FIG. 3 is a side view of the float shown in FIG. 2;

FIG. 4 is a front view of the float of FIG. 3;

FIG. 5 is a bottom view of the float of FIG. 3;

FIG. 9 is a sectional view of the valve assembly of FIG. 8 after closure of the exhaust ports.

DETAILED DESCRIPTION OF PREFERRED EMBODIMENTS

Figure 1:
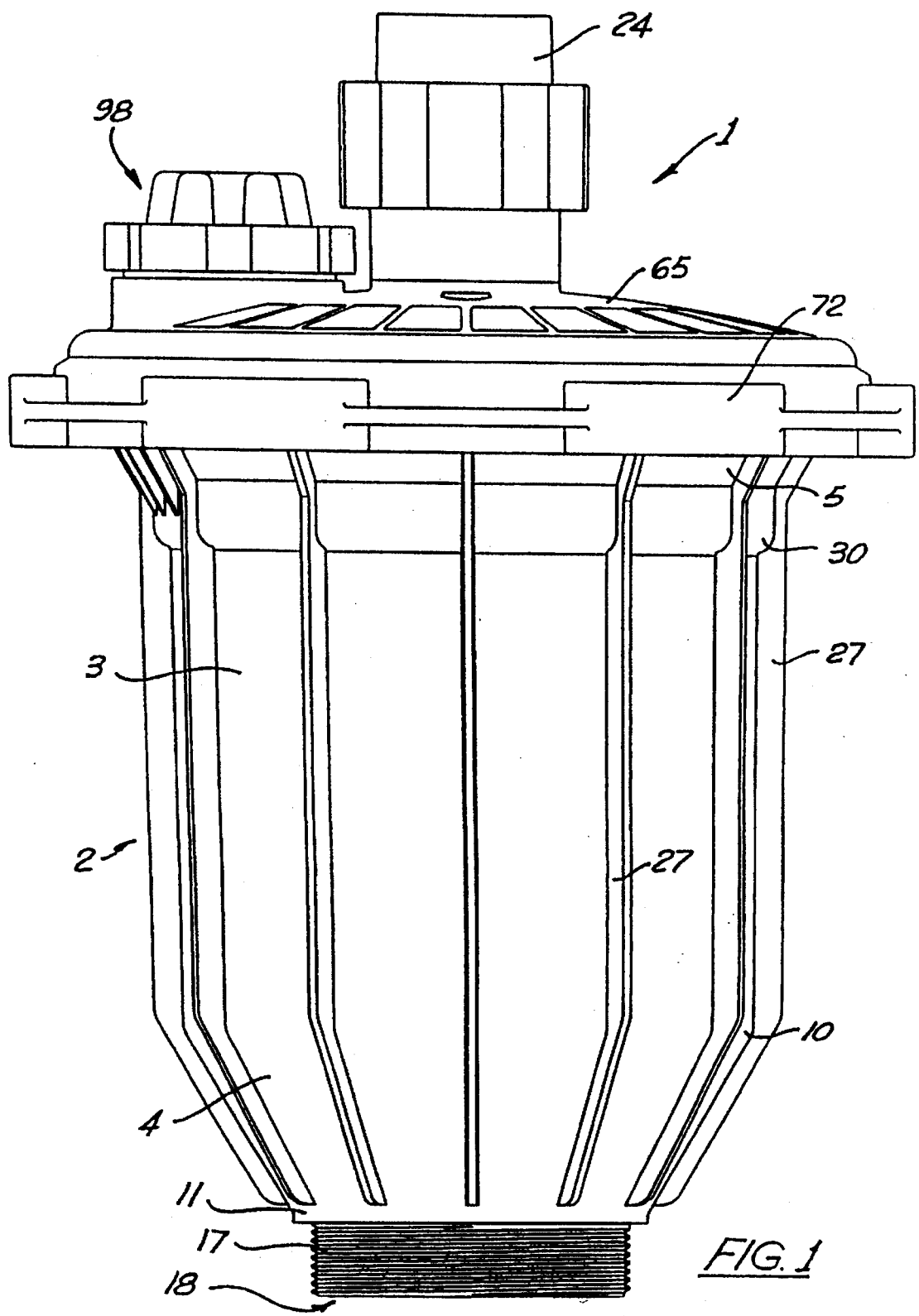
FIG. 1 is a side view of a pneumatic pump including a valve assembly according to the present invention.
Figure 2:
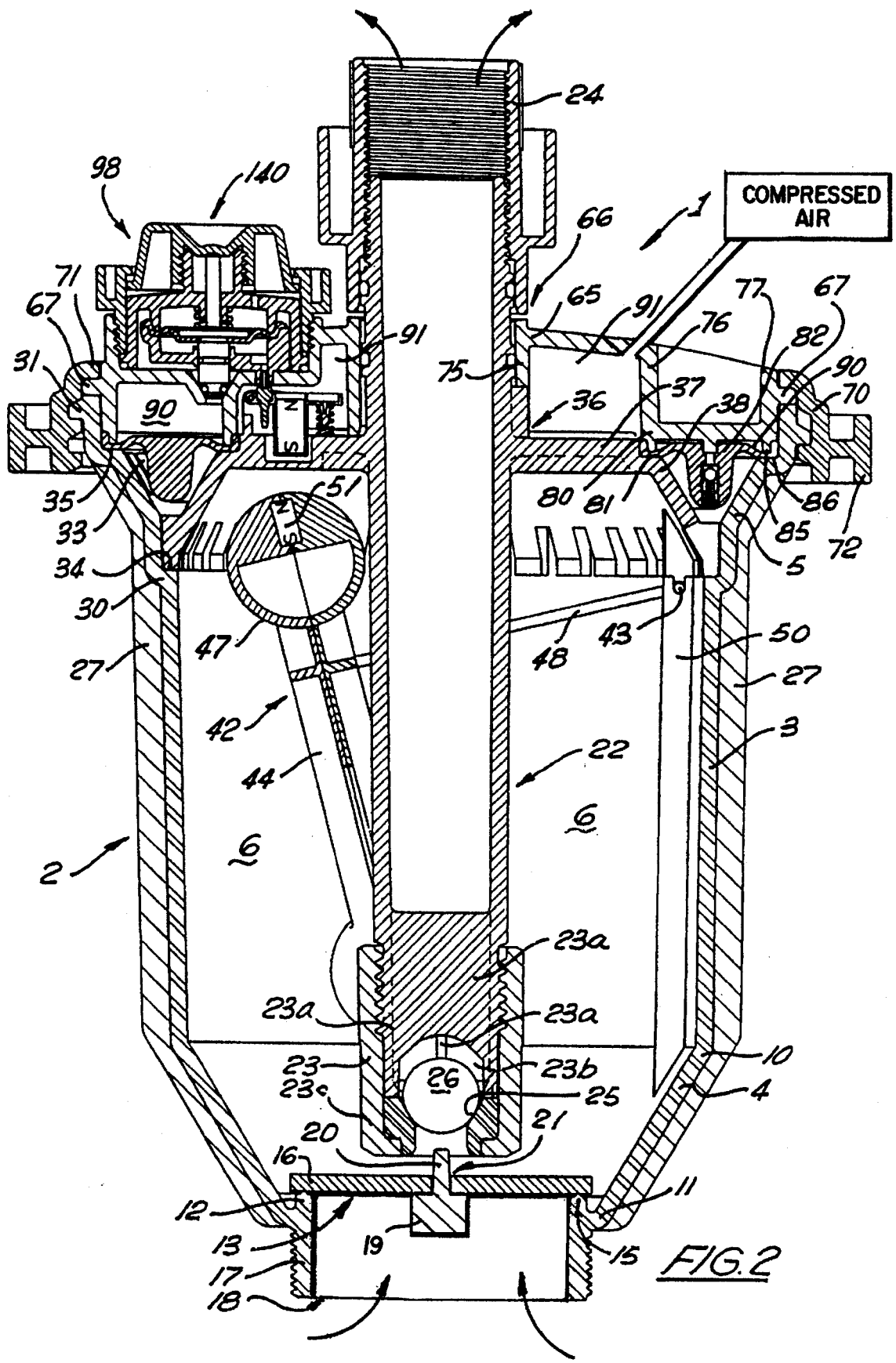
FIG. 2 is a sectional view through the pump of FIG. 1.
Figure 6:
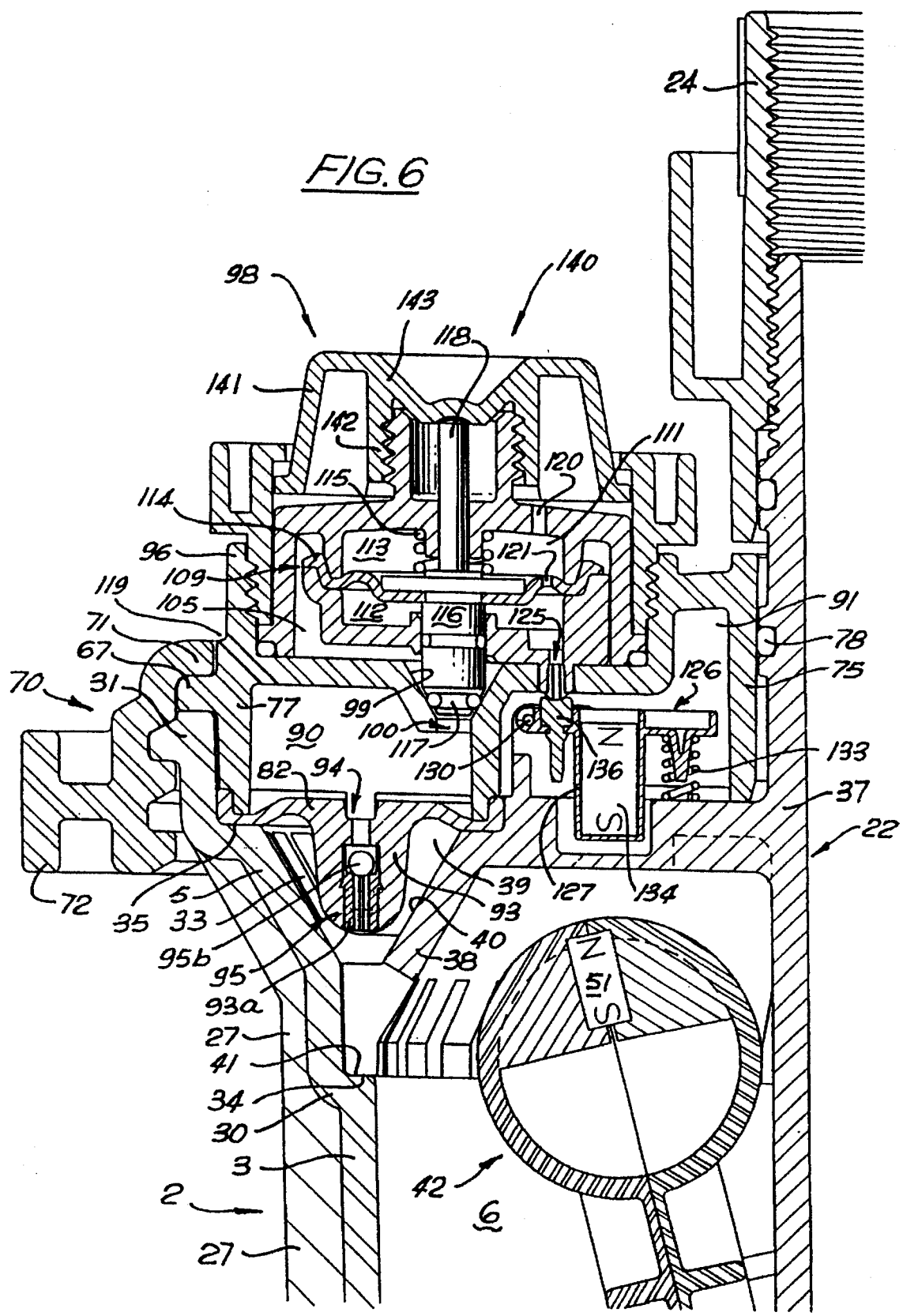
FIG. 6 is an enlarged sectional view of the valve assembly of FIG. 1.

Referring in particular to FIGS. 1, 2 and 6 a pneumatic pump 1 includes a moulded plastic generally cylindrical housing 2 having an annular wall 3, a frustoconical bottom wall 4 and a threaded frustoconical top wall 5. Walls 3 and 4 define a main chamber or sump 6 for containing water which is to be pumped.

Bottom wall 4 extends from a first end 10 adjoining wall 3 to a second end 11 which defines an inwardly and upwardly directed annular lip 12. This lip defines an aperture 13 and includes an integrally formed sealing ring 15 for selectively sealingly engaging the periphery of a plate 16. The plate is movable between an upper and lower position in response to relative fluid pressures on either side thereof. When in the lower position and subsequently engaged with ring 15, as shown, plate 16 prevents any water from either entering or exiting sump 6 through aperture 13.

End 11 of bottom wall 4 also includes an outwardly directed integrally formed threaded wall 17 for providing a base for pump 1. Wall 17 defines a passageway 18 leading to aperture 13 which is spanned by a support member 19 or, in some embodiments, a plurality of divergent support members. These members provide additional rigidity to pump 1 while also supporting a centrally disposed guide formation 20 which extends upwardly into sump 6 and is received by a complementary centrally disposed aperture 21 in plate 16. Formation 20 guides the plate as it moves between the upper and lower positions.

An outlet pipe 22 extends from a first end 23 within that part of sump 6 defined by bottom wall 4 to a threaded second end 24 exterior sump 6 for allowing water to be removed from the sump. End 23 includes four radially diverging equally angularly spaced apart webbed portions 23a which define a cavity 23b. End 23 is also threaded for receiving an end connector 23c having a seat face 25. The seat face is configured for selectively seating a complementary spherical valve member 26 which prevents backflow into sump 6. Webbed portions 23a prevent member 26 progressing beyond cavity 23b. Second end 24 is adapted to receive a complimentarily threaded hose or pipe such that the water moving through outlet 22 is directed as required.

Housing 2 includes a plurality of radially diverging, angularly spaced apart strengthening ribs 27 which continuously extend along walls 5, 3 and 4. These ribs are integrally formed and provide the strength required for use in the harsh underground environment.

Wall 5 extends upwardly and away from a first end 30 adjacent the top of wall 3 to a second coarsely threaded end 31. Wall 5 includes a plurality of spaced apart apertures in the form of exhaust ports 33 to allow air flow between atmosphere and sump 6. Wall 5 also defines ledges 34 and 35 respectively adjacent ends 30 and 31.

Outlet pipe 22 includes a radially extending flange 36 having a generally circular portion 37 and a diverging angled wall 38 which extends from portion 37. Wall 38, in combination with wall 5 define both a chamber 39 and a seat face 40.

The periphery 41 of angled wall 38 abuts ledge 34 and is castellated to allow movement of air from sump 6 into chamber 39 and out through ports 33.

A float 42 is mounted for rotation about an axis 43 within sump 6. As best shown in FIGS. 3, 4 and 5, float 42 includes an A-shaped frame 44 for supporting three floatation members 45, 46 and 47 in a fixed spaced apart relationship. These members are preferably hollow or substantially hollow to provide sufficient buoyancy to rotate float 42 about axis 43 in response to the water level in sump 6. It is also preferred that members 45, 46 and 47 displace a minimum volume in sump 6.

Frame 44 includes a perpendicularly extending support bar 48 for engaging at its free end 49 a complementary slot of an internal support rib 50 (see FIG. 2). Preferably end 49 engages two opposed slots associated with respective spaced apart ribs to ensure axis 43 remains fixed. More preferably, end 49 is captively retained within the complementary slots. Member 47 encases therein a permanent magnet 51 having the poles orientated as shown.

Referring again to FIG. 2 adjacent end 24 of pipe 22 is disposed a generally circular cap 65 which includes a central aperture 66 through which pipe 22 passes. Cap 65 extends radially outward from pipe 22 and includes a peripheral formation 67 for intimately abutting against and sealingly engaging end 31 of threaded wall 5. To maintain formation 67 and end 31 in abutment a retaining ring 70 having a retaining lip 71 is threaded onto wall 5 such that lip 71 engages formation 67. Ring 70 includes a plurality of spaced radial extensions 72 for allowing ease of threading of the ring by hand.

Cap 65 also includes three concentric annular projections 75, 76 and 77. Projection 75 extends downwardly about the periphery of pipe 22 and engages a rubber sealing ring 78 (see FIG. 6) which is retained in a complementary circumferential channel on the exterior of pipe 22.

Projection 76, however, extends from cap 65 to an end 80 which abuts against the inner radial edge 81 of an annular diaphragm 82. This projection maintains edge 81 in sealing engagement with the upper surface of portion 37.

Projection 77 extends between formation 67 to an end 85 which abuts against the outer radial edge 86 of diaphragm 82 and maintains edge 86 in sealing engagement with ledge 35.

Projection 76, cap 65, projection 77 and diaphragm 82 collectively define an annular chamber 90, while projection 75, pipe 22, portion 37, projection 76 and cap 65 define a second adjacent concentric annular chamber 91.

Diaphragm 82 includes a central plunger 93 which at least at one predetermined location includes a through port 94 having a ball valve 95 for allowing selective fluidic communication between chamber 90 and sump 6. Valve 95 is formed by an insert 93a engaged in an interference fit within port 94 and defining a cavity for captively retaining a generally spherical valve member 95b.

Cap 65 includes a threaded formation 96 (FIG. 6) for accepting a valve assembly 98 which selectively supplies compressed air to sump 6 to remove any water therefrom. Formation 96 is disposed above an appropriately formed portion of cap 65 which includes a seat face 99 and aperture 100 leading into chamber 90.

Referring in particular to FIG. 6, valve assembly 98 includes a chamber 105 which is supplied compressed air via an inlet pipe which also supplies chamber 91 via a suitable passageway. Included within chamber 105 is a valve 109 which includes a chamber 111 divided into two separate compartments 112 and 113 by a pliant diaphragm 114. Diaphragm 114 is biased toward compartment 112 by a spring 115. A plunger 116 is fixedly connected to diaphragm 114 and extends from chamber 111 and includes a moulded frustoconical end 117 for selectively sealingly engaging seat face 99 and preventing air flow between chambers 105 and 90. End 117 supports an O-ring to facilitate this sealing engagement. Plunger 116 also extends to a second end 118 which is retained within a suitably moulded portion of unit 98 such that upon movement of diaphragm 114, plunger 116 is constrained for movement in a predetermined direction.

Two air bleed passageways 119 and 120 respectively extend from chamber 90 and compartment 113 to atmosphere for allowing a gradual return to atmospheric pressure therein when the supply of compressed air to the respective chamber and compartment is discontinued. A further bleed passageway 121 extends through diaphragm 114 to ensure a gradual equalization of pressure in both compartments 112 and 113 such that the diaphragm will eventually return to its original biased position.

An aperture 125 extends between compartment 112 and chamber 91 for allowing fluidic communication therebetween. Disposed within chamber 91 and selectively covering aperture 125 is a switch mechanism 126. This mechanism includes a body 127 mounted at a first end for rotational movement about pivot pin 130. Body 127 is adapted at a second end for engaging a spring 133 which biases the second end away from portion 37. Body 127 supports a second magnet 134 intermediate the first and second ends with the poles orientated as shown.

Also disposed intermediate the first and second ends is a rubber stop 136 which is movable in and out of sealing engagement with aperture 125 to selectively prevent movement of air therethrough. Spring 133 biasses stop 136 into engagement with aperture 125.

In use, pump 1 is inserted in a water filled cavity, or alternatively, a cavity is produced into which the pump is then placed for subsequent removal of water draining into that cavity. Pump 1 is able to operate while totally submerged in the water to be pumped. Moreover, pump 1 need not be maintained in a vertical configuration and will satisfactorily operate when inclined up to at least 60° from the shown vertical configuration.

Initially, with sump 6 being empty, float 42 will be in the position shown in FIGS. 2 and 6, and as such: switch mechanism 126 will be positioned to prevent compressed air from moving from chamber 91 into compartment 112; and diaphragm 117 will be resting against seat face 99 for preventing compressed air passing between chamber 105 and 90. Accordingly, body 93 of plunger 82 will be spaced apart from seat face 40 and as such exhaust ports 33 are maintained in fluidic communication with sump 6.

It will be appreciated that port 94 is preferably diametrically opposed to valve unit 98 as shown in FIG. 2, however, for convenience FIGS. 6 to 9 shown port 94 adjacent unit 98.

The operation of pump 1 will now be described with reference to FIGS. 2 and 6 to 9, and in particular to FIGS. 6 to 9 where corresponding features are denoted by corresponding reference numerals.

Figure 7:
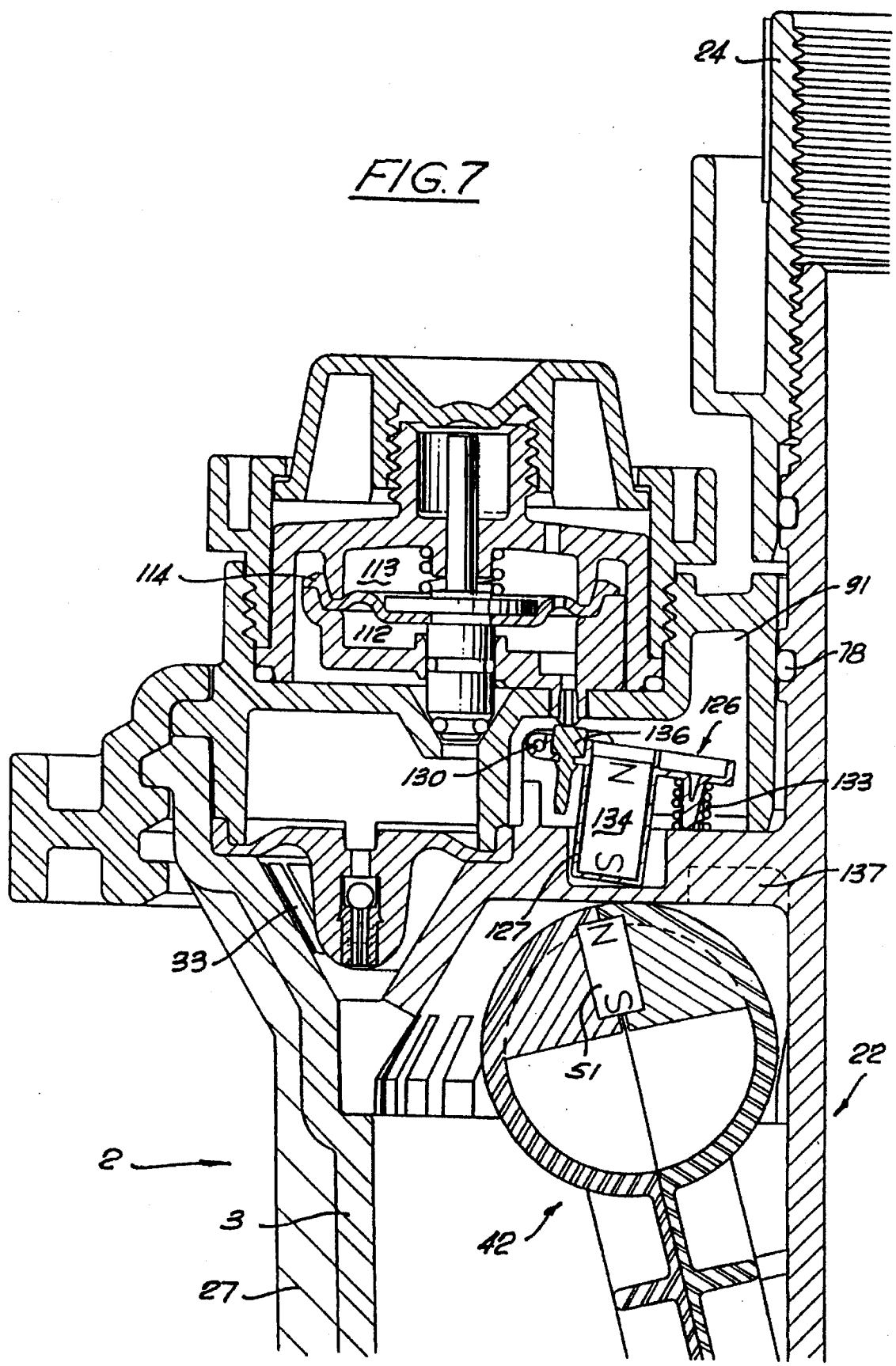
FIG. 7 is a sectional view of the valve assembly of FIG. 6 showing the opening of the pilot valve.

As the water surrounding pump 1 rises it will cause plate 16 to lift from sealing ring 15 and allow the water to enter sump 6. Any air contained within sump 6 freely moves through exhaust ports 33. A continued rise in water level will eventually move float 42 to the raised position as best shown in FIG. 7.

Figure 8:
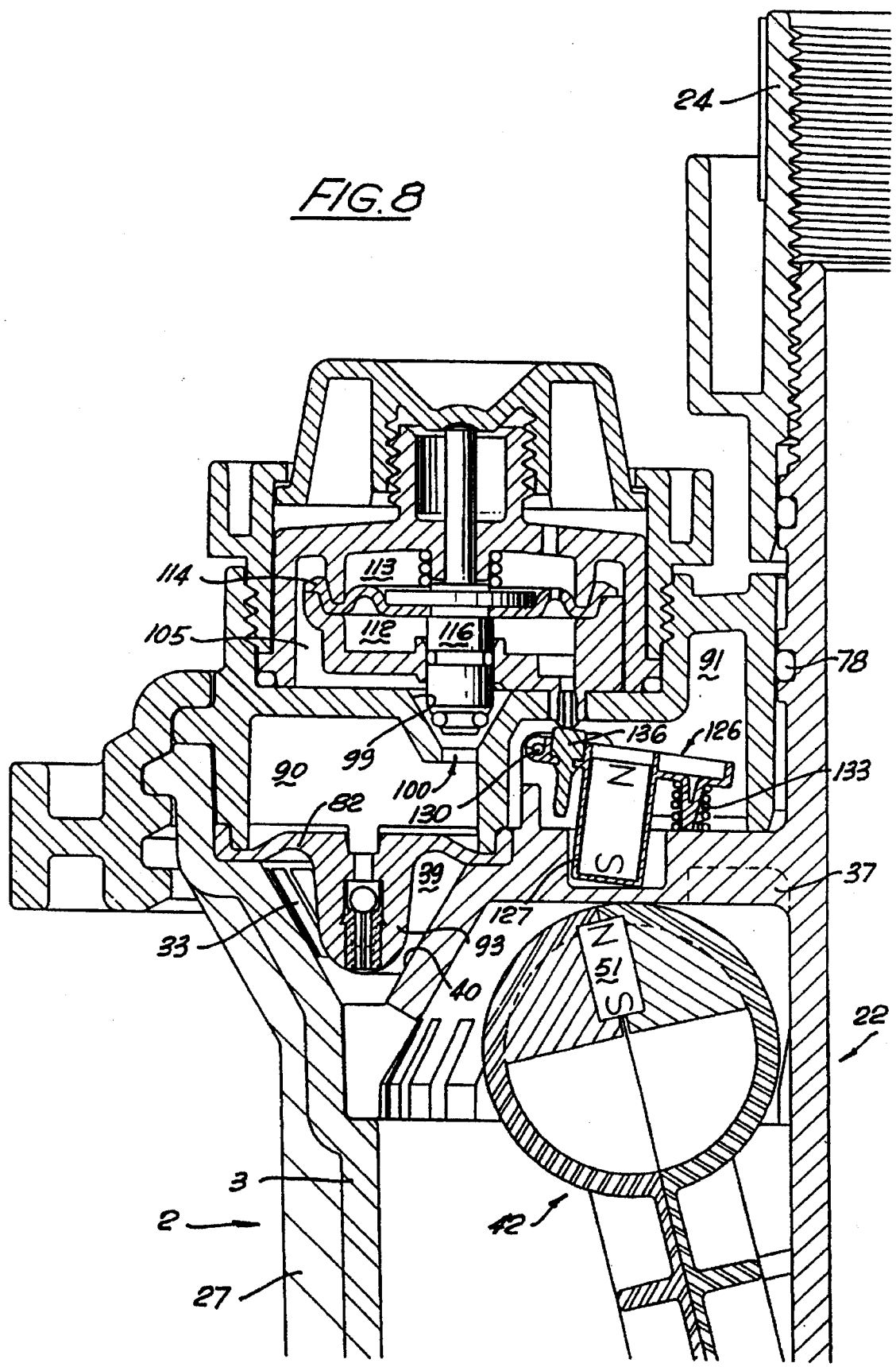
FIG. 8 is a sectional view of the valve assembly of FIG. 7 after movement of said plunger from said seat face.

This movement brings magnets 51 and 134 into close proximity, and by attractive forces rotates body 127 about pin 130 against the bias of spring 133. Compressed air is thereafter able to flow from chamber 91 into compartment 112. As best shown in FIG. 8, the above action results in the movement of diaphragm 114 from its resting disposition and the consequential removal of plunger 116 from seat face 99.

Compressed air contained within chamber 105 is now able to move through aperture 100 into chamber 90 which, as shown in FIG. 9, forces diaphragm 82 to assume a flattened configuration whereby body 93 is presented to seat face 40. Chamber 39 is now isolated from sump 6. The compressed air within chamber 90 sequentially moves through port 94, valve 95 and into sump 6. The increased pressure in the sump forces plate 16 back into the closed position against ring 15 while simultaneously moving valve member 26 from seat face 25 such that the water within the sump is forced to move through pipe 22.

As the water level in sump 6 falls, so too does float 42. Once the float is sufficiently withdrawn from the upper position the attractive forces between magnets 51 and 134 will be overcome by the bias of spring 133, and as such stop 136 will again be moved into abutment with aperture 125.

Following the closure of aperture 125 the pressure between chambers 112 and 113 slowly equalizes due to bleed passageway 121 in diaphragm 114. Due to the second bleed passageway 120 communicating with atmosphere the air within both chambers 112 and 113 will eventually return to atmospheric pressure. As a result the action of spring 115 will be to gradually bias diaphragm 114 to its initial position and gradually present end 117 of plunger 116 against seat face 99. That is, valve 98 returns to the configuration illustrated in FIG. 6.

With aperture 100 closed the compressed air held within chamber 90 is bleed through passageway 119 such that diaphragm 82 gradually returns to its initial position. Exhaust ports 33 are once again in communication with sump 6 and water is free to move plate 16 and enter the sump. Once sufficient water has entered the above mentioned operation repeats until all the water has been removed.

Accordingly, the novel valve assembly provides for an automatic reciprocally operable pump. The construction of both pump 1 and valve assembly 98 is durable and allows ease of repair or replacement. Pump 1 is as a result provided with a versatile control without requiring a large number of intricate or moving components.

The preferred embodiment illustrated also includes an adjustment device 140 for allowing the manual adjustment of the rate of supply of compressed air into sump 6. Referring in particular to FIG. 6, device 140 includes a hand operable dial 141 rotatable mounted to valve unit 98 by way of a threaded mounting 142.

Device 140 includes an inwardly extending wall 143 which supports a centrally disposed abutment for limiting the maximum axial excursion of end 118 of plunger 116. Consequently, the maximum extent to which end 117 is able to lift from seat face 99 is regulated by appropriately axially progressing dial 141 by rotation. Such regulation is advantageous in applications where the water is to be pumped against a small head and the full force of the compressed air is not required. That is, the compressed air is generally supplied through the inlet pipe at 100–125 psi, and for example, if the water is only required to be raised by twenty meters this pressure is far in excess of that required.

Adjustment device 140 is able to be embodied in many other forms and in other embodiments is automatically controlled in response to the back pressure in outlet pipe 22.

It is preferred that substantially all the pump is produced from moulded plastic components due to their favorable corrosion resistance and light weight. The plastics are advantageously selected to be substantially unaffected by water having a pH in the range of 3 to 12 as is commonly encountered in mines. Such plastic components are able to be cheaply and easily manufactured with known techniques.

The pump is able to be left untended during periods of operation and will not run dry due to the automatic valve operation. This represents a cost savings in respect to both compressed air and wear and tear of the pump itself.

Further embodiments of the invention include a pump having a plurality of chambers operating in sequence to supply a single outlet pipe. For example, when two chambers are used, while one is being filled with water the second is in the process of being evacuated of water, and vice versa. A pump thus constructed would be advantageous over two separate pumps having a single chamber as a more constant demand of compressed air will be required while also supplying a more continuous outflow of water.

It is preferred that pump 1 is mounted in a stand (not shown) which obliquely inclines the pump from the vertical configuration illustrated in the accompanying drawings. When so inclined water surrounding pump 1 will have easy access to aperture 13. More preferably, the stand includes a body which surrounds walls 3 and 4 and includes an aperture through which threaded wall 17 extends. An appropriately sized nut or the like can then be threaded onto wall 17 to secure pump 1 within the stand.

In highly preferred embodiments the stand is hollow and can be selectively filled with ballast, such as water or sand, to ensure pump 1 remains stationary during operation. When transportation is required the ballast can be removed.

The float 42 can be alternatively configured if required. Some embodiments include a float centrally mounted to outlet pipe 22.

Although the invention has been described with reference to specific examples it will be appreciated by those skilled in the art that the invention may be embodied in many other forms.

We claim:

1. A pneumatic pump including:
   a main chamber for containing a liquid to be pumped and having an inlet and outlet through which the liquid respectively enters and exists the main chamber;
   a float movable between a lowered and a raised position in response to a level of liquid in the main chamber; and
   a valve assembly for selectively supplying compressed air through a passageway having a first seat face, said valve assembly including:
   (a) a valve chamber divided into a first and a second compartment by a first pliant diaphragm and including a port, a first biasing means biasing said first diaphragm toward said first compartment;
   (b) a plunger extending through and sealingly engaging said first port, said plunger including a first end disposed inside said valve chamber and a second end disposed outside said valve chamber, said plunger being movable in response to movement of said first diaphragm for selectively sealingly engaging said first seat face with second end;
   (c) an aperture extending from said passageway, upstream of said first seat face, to said first compartment for fluidic communication therebetween;
   (d) a valve biased toward a closed position over said aperture and selectively moveable into an open position for compressed air to enter said first compartment and move said first diaphragm against said first biasing means and thereby withdraw said second end of said plunger from said first seat face; and
   (e) a bleed passage extending between said first and second compartments for gradual equalization of pressure therebetween, whereby movement of said valve into the closed position effects a delayed presentation of said second end of said plunger to said first seat face, wherein the passageway, downstream of said first seat face, extends into the main chamber and movement of the float to and from the raised position of the float engages means for moving the valve to an open and closed position respectively for selectively supplying compressed air to the main chamber to remove the liquid therefrom.

2. A pump according to claim 1 wherein the main chamber includes an exhaust port for exhausting of air from said main chamber thus to allow liquid to freely enter the main chamber when the second end of said plunger engages the seat face, means for closing the exhaust port during supply of compressed air to the main chamber.

3. A pump according to claim 2 wherein the exhaust port extends from said passageway, intermediate said first seat face and said main chamber, to atmosphere and said passageway includes a second seat face disposed between said main chamber and said exhaust port which is selectively sealable by a second pliant diaphragm, said second pliant diaphragm including a through passage for allowing supply of compressed air to said main chamber while said second diaphragm seals said second seat face.

4. A pump according to claim 3 wherein said through passage includes a second valve for preventing the passage of fluids therethrough and toward said first seat face.

5. A pump according to claim 1 including a first magnet means moveable by said float to a position to influence a second magnet means on said valve of paragraph (d).

6. A pump according to claim 1 wherein said float is mounted about an axis for rotation within said main chamber for movement between said raised and lowered position.

* * * * *